Oct. 31, 1950     L. J. KMIECIK     2,528,440
SAFETY RELIEF VALVE CONSTRUCTION
Filed June 16, 1948
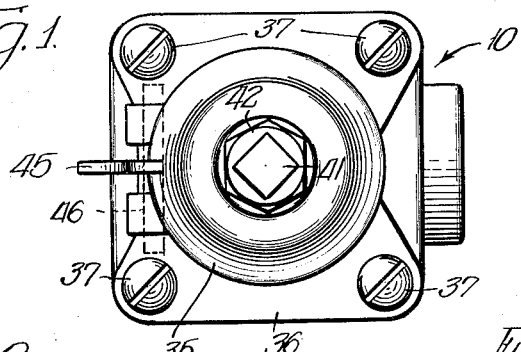
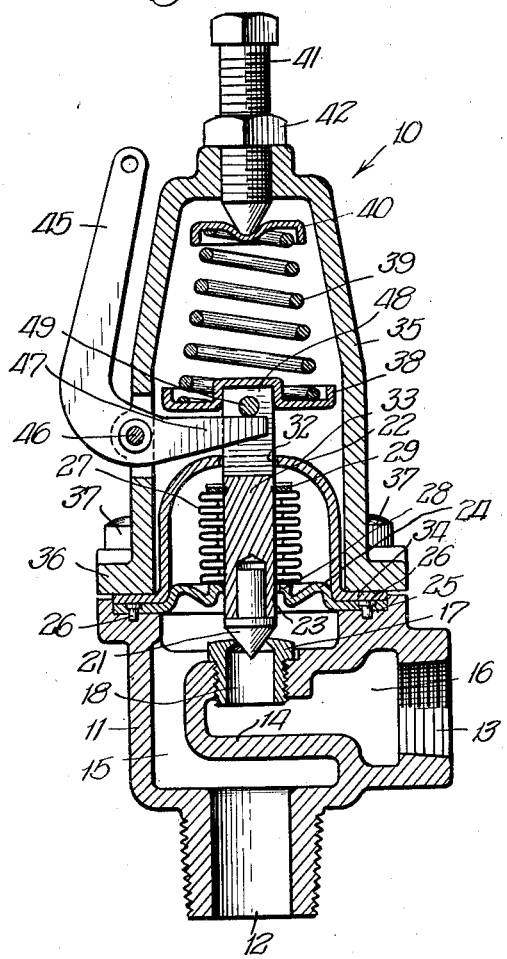
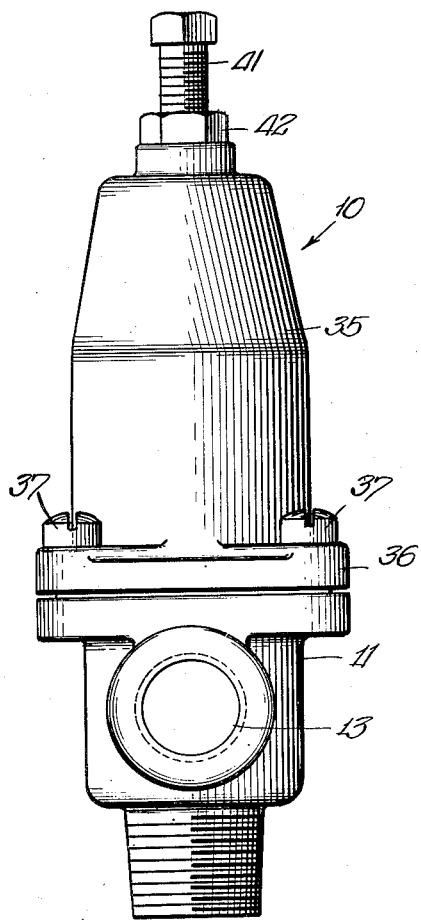
INVENTOR.
Leopold J. Kmiecik, Patented Oct. 31, 1950

2,528,440

UNITED STATES PATENT OFFICE 2,528,440

SAFETY RELIEF VALVE CONSTRUCTION

Leopold J. Kmiecik, Chicago, Ill., assignor to McDonnell & Miller, Inc., Chicago, Ill., a corporation of Delaware Application June 16, 1948, Serial No. 33,357

4 Claims. (Cl. 137—53)

This invention relates, generally, to valves and it has particular relation to safety relief valves.

Among the objects of this invention are: To provide a safety relief valve that is positive in action, unlikely to get out of order in use and can be manufactured economically; to construct such a valve so that it can be dismantled completely without disturbing its connection in the piping system in which it is arranged to operate; to employ a bellows in conjunction with a spring biased valve member with the bellows arranged to be subject to pressure to lift the valve member from a valve seat; to enclose the valve stem, bellows and spring in a removable spring housing; to pivot a try out handle on the housing for moving the valve stem to lift the valve member off of the valve seat; to guide the valve stem in a valve construction; to adjust the tension of the spring; and to employ a spring of such a configuration that it can be adjusted to hold the valve member in engagement with the valve seat against the wide range of pressures.

Other objects of this invention will, in part, be obvious and in part appear hereinafter.

This invention is disclosed in the embodiment thereof shown in the accompanying drawing and it comprises the features of construction, combination of elements and arrangement of parts which will be exemplified in the construction hereinafter set forth and the scope of the application of which will be indicated in the appended claims.

For a more complete understanding of the nature and scope of this invention, reference can be had to the following detailed description, taken together with the accompanying drawing, in which:

Figure 1 is a top plan view of a safety relief valve constructed in accordance with this invention;

Figure 2 is a longitudinal sectional view of the valve construction shown in Figure 1; and Figure 3 is a view, in side elevation, of the valve shown in the preceding figures.

Referring now particularly to the drawing, it will be observed that the reference character 10 designates, generally, a safety relief valve in which the present invention is embodied. As shown in Figures 2 and 3, the valve 10 includes a valve body 11 which has an inlet opening 12 and an outlet opening 13. These openings may be internally or externally threaded as shown to permit suitable connection to the piping system in which the valve 10 is to be installed. The valve body 11 has a dividing wall 14 therein which serves to separate the valve body 11 into a pressure chamber 15 which communicates directly with the inlet opening 12 and an exhaust chamber 16 which communicates directly with the outlet opening 13. There is a valve seat 17 that may be threaded into the dividing wall 14, as shown, and it has an opening 18 therethrough which, when unobstructed, places the pressure chamber 15 in communication with the exhaust chamber 16.

The opening 18 through the valve seat 17 may be closed by a conical valve member 21 which is carried at the lower end of a valve stem 22 that is arranged to reciprocate in a vertical direction through a clearance opening 23 in a bellows base 24. The bellows base 24 may be circular and it may be located in a correspondingly shaped recess 25 in the upper surface of the valve body 11. Dowels 26 extend from the bellows base 24 into suitable openings in the valve body 11 in order to insure that the base 24 will always be located in a given position. It will be observed that the valve stem 22 extends upwardly through a bellows 27 the lower end of which may be secured, as by soldering, to a central annular portion 28 of the bellows base 24. The upper end of the bellows 27 may be secured, as by soldering, to a collar 29 which extends radially from the valve stem 22.

Now it will be apparent that the interior of the bellows 27 is in direct communication through the clearance opening 23 with the pressure chamber 15. Accordingly, the pressure which exists in the pressure chamber 15 also is exerted against the bellows 27 and serves to expand it and lift the valve stem 22 so as to move the valve member 21 away from the valve seat 17. As will appear hereinafter, this pressure reacts against a spring which urges the valve stem 22 downwardly.

Near its upper end the valve stem 22 is guided in a central opening 32 in a dome shaped stamping 33. The stamping 33 has a radial flange 34 which overlies the periphery of the bellows base 24 and interfits in the upper portion of the recess 25 in the valve body 11 as shown.

With a view to holding the bellows base 24 and the stamping 33 in position and permitting their removal without requiring that the valve body 11 be disconnected from the piping system in which it is connected, a spring housing 35 is provided with a bottom flange 36 which overlies the upper surface of the valve body 11 and bears against the upper surface of the flange 34. Bolts 37 extend through the bottom flange 36 and are threaded into the upper side of the valve body 11 for the purpose of holding the spring housing 35 in place and clamping the bellows base 24 and dome shaped stamping 33 between it and the valve body 11.

As indicated hereinbefore, the valve stem 22 is biased downwardly by a spring against the pressure that is exerted within the bellows 27 and the pressure chamber 15. It will be noted that a large diameter cupped washer 38 is located on the upper end of the valve stem 22 for receiving the bottom turns of a coil compression conical spring 39. The upper turns of the spring 39 bear against a small diameter cupped washer 40 which is dished at the center for receiving the lower pointed end of an adjusting screw 41 which may be threaded in the upper end of the spring housing 35. A lock nut 42 serves to hold the adjusting screw 41 in any position in which it may be set. By providing the conical form of spring 39 rather than the conventional helical spring in which the convolutions are of uniform diameter, it is possible to obtain a wide range of adjustment using a single spring 39. For example, tests have shown that a single spring 39 when it is of conical form can be adjusted to permit opening of the valve member 21 at any pressure ranging from twenty pounds to one hundred pounds per square inch. Thus it is unnecessary to supply a number of different springs for the same valve construction in order to cover a relatively wide range of pressures. Rather, using the conical spring construction 39, a single spring only is required for this wide range of pressures.

It is desirable to provide for opening the valve member 21 manually. For this purpose a try out handle 45 may be employed. As shown, the try out handle 45 may be rockably mounted on a pin 46 which extends through suitable ears that may be formed integrally with the spring housing 35. An arm 47 of the handle 45 extends into the spring housing 35 between the branches of the bifurcated upper end 48 of the valve stem 22. The arm 47 is arranged to bear against a transverse pin 49 so that when the handle 45 is rocked about the pin 46 in a counterclockwise direction, the valve stem 22 is moved upwardly against the biasing force of the spring 39.

The dismantling of the valve construction 10 without removing the valve body 11 from its connection in the piping system is a comparatively simple operation. First, the pin 46 is removed to permit removal of the try out handle 45. Thereafter, the four screws or bolts 37 are removed and this permits the removal of the spring housing 35, thereby exposing the complete working mechanism of the valve 10. If desired, of course, the pressure exerted on the coil compression conical spring 39 can be relieved by unscrewing the adjusting screw 41.

Since certain changes can be made in the foregoing construction and different embodiments of the invention can be made without departing from the spirit and scope thereof, it is intended that all matter shown in the accompanying drawing and described hereinbefore shall be interpreted as illustrative and not in a limiting sense.

What is claimed as new is:

1. A safety relief valve comprising, in combination, a valve body having inlet and outlet openings, a valve seat in said valve body having an orifice therethrough placing said inlet and outlet openings in communication, a valve member cooperating with said valve seat to close said orifice, a valve stem carrying said valve member at one end, a bellows base cooperating with said valve body and therewith defining a pressure chamber in direct communication with said inlet opening, there being a clearance opening in said bellows base through which said valve stem is movable, a bellows secured at one end to said bellows base and at the other end directly to said valve stem providing an extension of said pressure chamber about said valve stem and arranged on application of predetermined pressure therein to lift said valve stem and therewith said valve member off of said valve seat, and a spring cooperating with said valve stem and acting to bias said valve member into engagement with said seat thereby determining the pressure at which said valve member is lifted off of said valve seat, a dome shaped member provided with a mounting flange, said dome shaped member extending from the bellows base around the bellows and valve stem and having an opening through which the latter is guided, a spring housing extending from the valve body and enclosing the valve stem, bellows, spring and dome shaped member, bolts extending through said spring housing into said valve body to hold them together and to clamp the mounting flange of said dome shaped member and bellows base therebetween, and with said spring biased between said valve stem and said spring housing.

2. The safety relief valve of claim 1 in which the mounting flange of the dome shaped member is of annular configuration.

3. The safety relief valve of claim 2, wherein dowels extend from the bellows base into openings in the valve body.

4. The invention, as set forth in claim 1, wherein adjusting means are provided for the spring and the spring is a coil compression conical spring whereby the same can be adjusted to hold the valve member in engagement with the valve seat against a wide range of pressures in the pressure chamber.

LEOPOLD J. KMIECIK.

REFERENCES CITED

The following references are of record in the file of this patent:

UNITED STATES PATENTS

| Number | Name | Date |
|---|---|---|
| 2,173,678 | Brendlin | Sept. 19, 1939 |
| 2,258,335 | Moore | Oct. 7, 1941 |
| 2,332,630 | Fawkes | Oct. 26, 1943 |
| 2,392,178 | Paget | Jan. 1, 1946 |